United States Patent [19]

Futamura et al.

[11] Patent Number: 5,241,678
[45] Date of Patent: Aug. 31, 1993

[54] PROGRAM TRANSLATION BASED ON GENERALIZED PARTIAL COMPUTATION

[75] Inventors: Yoshihiko Futamura, Hino; Kenroku Nogi, Koganei, both of Japan

[73] Assignee: Hitachi, Ltd., Tokyo, Japan

[21] Appl. No.: 884,466

[22] Filed: May 13, 1992

Related U.S. Application Data

[63] Continuation of Ser. No. 258,160, Oct. 14, 1988, abandoned.

[30] Foreign Application Priority Data

Apr. 15, 1988 [JP] Japan .................................. 63-91554

[51] Int. Cl.$^5$ .............................................. G06F 7/00
[52] U.S. Cl. .............................. 395/700; 364/DIG. 1; 364/280; 364/280.4
[58] Field of Search ................... 395/700, 650

[56] References Cited

U.S. PATENT DOCUMENTS

| | | | |
|---|---|---|---|
| 3,408,630 | 10/1968 | Packard et al. | 364/200 |
| 4,315,315 | 2/1982 | Kossiakoff | 364/300 |
| 4,330,822 | 5/1982 | Dodson | 364/200 |
| 4,463,423 | 7/1984 | Potash et al. | 364/200 |
| 4,773,007 | 9/1988 | Kanada et al. | 364/200 |

OTHER PUBLICATIONS

"Computer, Systems, Controls 2", No. 5, 1971, pp. 45-50.

Kahn, K. M.: Partial Evaluation of Lisp Written in Prolog, UPMAIL Report Department of Computer Science, Uppsala University, Uppsala, Sweden, Mar. 11, 1982.

Primary Examiner—Kevin A. Kriess
Attorney, Agent, or Firm—Antonelli, Terry, Stout & Kraus

[57] ABSTRACT

A program translation method for translating a first program including at least a conditional branch step into a second program through a partial computation. Whether or not a condition expression included in the first program is satisfied is judged depending on known information. If such judgement can not be made, the routine of each branch destination of the condition expression is subjected to a partial computation based on the known information and additional information indicating the branch condition of the condition expression. When the routine at the branch destination is a non-primitive function, prior to the partial computation of the routine at the branch destination, a unique name is assigned to a result of the partial computation such that the name is referenced at an intermediate point of the partial computation.

1 Claim, 13 Drawing Sheets

FIG. 6E  f5(u,t)==TRUE

( m1 ( cdr ( t ) ) ) i5 =

= ( h2 ( cdr ( t ) ) ) i5 =

= ( h1 ( cdddr ( t ) ) ) i5

FIG. 14D h4[t] =
- null(cdddr(t)) → false (203D) ← 202D
- B ≠ cadddr(t) → h3(cdr(t)) (205D)
- → true (206D) ← 204D

FIG. 15

$m_1[t] = f_2 [ \ (A\ B\ C\ A\ A\ B) ; t\ ]$ ------ 106A $= f_3 [ \ (\ \ \ B\ C\ A\ A\ B) ; t\ ]$ ------ 106B $= m_1 [ \ (A\ B\ C\ A\ A\ B) ; t\ ]$ ------ 105C $= f_2 [ \ (\ \ \ B\ C\ A\ A\ B) ; t\ ]$ ------ 106A $= m_1 [ \ (\ \ \ \ \ C\ A\ A\ A\ B) ; t\ ]$ ------ 105B $= m_1 [ \ (\ \ \ \ \ \ \ A\ A\ A\ B) ; t\ ]$ ------ 105A $= f_2 [ \ (\ \ \ \ \ \ \ A\ A\ B) ; t\ ]$ ------ 106A $= f_3 [ \ (\ \ \ \ \ \ \ \ \ A\ B) ; t\ ]$ ------ 106B $= f_4 [ \ (\ \ \ \ \ \ \ \ \ \ \ B) ; t\ ]$ ------ 106C $= f_5 [ \ (\ \ \ \ \ \ \ \ \ \ \ \ ) ; t\ ]$ ------ 106D $= $ TRUE

= $h_1((\quad CAAAB\ ))$ ----- 205C

= $h_1((\quad AAAB\ ))$ ----- 205A

= $h_2((\quad AAAB\ ))$ ----- 206A

= $h_3((\quad AAAB\ ))$ ----- 206B

= $h_4((\quad AAAB\ ))$ ----- 206C

= TRUE ----- 206D

PROGRAM TRANSLATION BASED ON GENERALIZED PARTIAL COMPUTATION

This application is a continuation of application Ser. No. 258,160, filed on Oct. 14, 1988, now abandoned.

BACKGROUND OF THE INVENTION

The present invention relates to a computer program translation method, and in particular, to a program translation method in which a given program is translated by use of partial computations so as to obtain an efficient program through specialization.

In a computer program, in general, a kind of data is received to effect processing based thereon so as to attain a desired result. For example, in an example of a program f which receives data values $k_0$ and $u_0$ for two parameters k and u for a processing, when achieving an ordinary computation processing (the overall computation), the processing of the program f $(k_0, u_0)$ is accomplished after both input data items $k_0$ and $u_0$ are received. In contrast thereto, there has been a computation method known as a partial computation or evaluation of a program in which the computation of the program f is immediately started when one of the data items, for example, $k_0$ is inputted such that the computation executable based on $k_0$ is achieved and that a portion which cannot be executed unless the value of u is supplied remains unexecuted, thereby generating a new intermediate program $f_{k0}(u)$. For the intermediate program $f_{k0}(u)$ thus attained through the partial computation, the computation with respect to k has already been finished in a range where the computation is possible. In consequence, when both values $(k_0, u_0)$ are prepared for k and u, the program execution time can be minimized by executing the program $f_{k0}(u_0)$ rather than the program $f(k_0, u_0)$.

Assuming here that the partial computation of the program f with respect to the parameter $k = k_0$ is represented as $\alpha\,[f;\,k_0]$, the intermediate program $f_{k0}$ can be expressed as follows.

$$\alpha[f;k_0]=f_{k0} \tag{1}$$

Furthermore, in the expression (1), when the program f and the parameter $k_0$ are replaced with an interpreter of a program language processing and a general program P, respectively, it has been known that the program attained through the partial computation $\alpha\,[I;\,P]$, $\alpha\,[\alpha;\,I]$, and $\alpha\,[\alpha;\,\alpha]$ become to be an object program, a compiler, and a compiler-compiler, respectively. The conventional program translation through these partial computations have been described in detail, for example, in the Partial Computation Method of Program on pages 157 to 165 of the "Journal of the Institute of Electronics and Communication Engineers of Japan", Vol. 86, No. 2 (February, 1983) and in the Partial evaluation of computer process on pages 45 to 50 of the "Computer, Systems, Controls 2", No. 5, 1971.

However, according to the conventional partial computation method, the partial computation is achieved only by use of information items related to parameters for which the values are known; in consequence, the range where the computation is executable, namely, where the program translation is possible through the partial computation is small, which leads to a problem in the practial use of the partial computation method.

SUMMARY OF THE INVENTION

It is therefore an object of the present invention to provide a novel program translation method capable of generating a program developing a higher performance as compared with a program attained through the conventional partial computation method.

In order to achieve the object above, according to the present invention, in addition to the variable values partially known like those employed in the case of the prior art, other information items related to the program operation environments are also used in the partial computation. Each program comprises a plurality of routines or steps associated with parts such as a conditional branch part, a constant part, a variable part, and a function part. The program translation through partial computations is sequentially achieved for each routine or step. Assuming here that a program routine or step (to be simply referred to as a program in some cases herebelow) as the unit of the translation processing is represented by a letter e, in a case where e includes a conditional branch section, namely, a condition expression, it is judged according to the present invention whether or not the true or false state of a condition part P described in the condition expression can be proved (or obtained) by use of a predetermined information item i. In a case where the judge result is identified as "true" or "false", the conditional branch part is deleted from the program, which is namely changed to execute a branch destination routine according to the judge result. In this case, a program translation resulting from a partial computation based on the information item i is added to the routine at the selected branch destination. On the other hand, when the false or true state of the branch condition cannot be proved in the conditional branch part, the conditional branch part is retained in the program after a program translation. In this case, according to the present invention, the program translation is achieved such that a partial computation is effected for the routine at each branch destination by use of sufficient information items obtained by adding the branch condition of the condition expression above to the information item i.

When the program e is a constant or a variable, the program includes the same content before and after the translation.

In a case where the program e is a composite expression, namely, can be represented by $e = f[g]$ for a function f, the content of the program after the translation varies depending on whether the function f is a primitive function or a non-primitive function. When the function f is a non-primitive function, the program can be further analyzed for development; however, when a parameter in the non-primitive function calls the function f in a recursive fashion, the similar partial computation is repeatedly achieved in some cases. According to the present invention, in order to avoid the repetitious partial computation due to such a recursive call, when a partial computaion of the non-primitive function f[g] is conducted with respect to the information item i, a function name (to be referred to as a partial definition function) is assigned to a result of the computation before the result is attained so as to be used during the computation.

The partial computation adopted in the program translation according to the present invention is represented by a letter $\beta$ for purposes of discrimination from the conventional partial computation $\alpha$. In the computation α, since the program is treated as a funtion f, the program translation is possible only in a portion where a conditional branch can be effected with a known value k₀ associated with the variable k. In contrast thereto, the program e is treated in a form in which a function and a parameter is combined in the computation β. Also in a case where the true or false state of a conditional branch cannot be proved by use of the information item i, the routine at the branch destination effects a partial computation by use of an additional information item indicating the branch condition from the branch part; in consequence, the number of partial computations is increased as compared with the case of the partial computation α, thereby obtaining a program having a higher efficiency.

BRIEF DESCRIPTION OF THE DRAWINGS

The foregoing and other objects, advantages, manner of operation and novel features of the present invention will be understood from the following detailed description when read in connection with the accompanying drawings.

DESCRIPTION OF THE PREFERRED EMBODIMENTS

According to the present invention, a judgement which cannot be effected due to an insufficient information in the conventional translation method becomes executable by use of a kind of logic system (to be called an underlying logic). In order to facilitate understanding of the following embodiments, description will be first given of definitions of terms and expressions.

Figure 2:
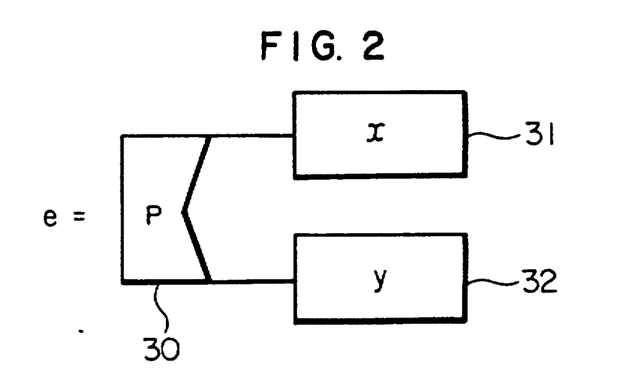
FIG. 2 is a schematic diagram showing the basic constitution of a program as a translation object.

Definitions of terms (i) In this specification, a program e as a translation object is represented in the format of the PAD (Problem Analysis Diagram: a graphical representation for the structured program) of the LISP program, for example, as shown in FIG. 2. In the example of FIG. 2, if the condition expression P of a block 30 holds (the judgement result is true), a block 31 is executed; otherwise (the judgement result is false), control proceeds to a block 32. That is, the expression is equivalent to a program description "if P then x else y". In an ordinary program, the block 31 or 32 further includes a condition judgement for a branch.

(ii) The condition expression is to be described in the u-form. In the u-form, only u is included as a constant, an undefined value (to be represented by a symbol ⊥), or a free variable. However, for example, also when a plurality of variables such as x and y are included, there is considered a variable-vector like $u=<x, y>$ such that a format actually including a plurality of variables can also be treated in the u-form.

(iii) The u-form is also introduced for the program e, and an interpreter of the u-form is represented as "eval". When a constant c is assigned as a value of the variable u, the value of e is described as eval[e; ((u.c))]. In this case, if the value of e is undefined, eval[e; ((u.c))]=⊥ results.

(iv) Information in which predicates related to the variable u are connected by use of the AND symbol (∧) as follows, for example, is called a "u-information".

$$\text{null}[u] \wedge (A = \text{car}[u]) \wedge \text{null}[\text{cdr}[u]]$$

(v) Between two u-information items i and p, if p can be proved or can be obtained from i, the relationship therebetween is represented as i ⊢*p. When p is false, the relationship is expressed as i ⊢* ⌐p.

(vi) When i and p are arbitrary u-information items having a relationship of i ⊢*p therebetween, and if $$\text{eval}[p;((u.c))] \leqslant \text{true}$$

is satisfied for an arbitrary constant C represented as $$\text{eval}[p;((u.c))] \leqslant \text{true}$$

there exists compatibility between the logic system and eval, and the logic system is assumed as an underlying logic L. If all predicates are to be used in the whole region, namely, the grand instance of each predicate has a true or false value in any case as a result of the processing of the interpreter, the symbol ≤ can be replaced with the equal symbol = in the definition above. This property is provided to guarantee a condition that the underlying logic is not inconsistent with the interpreter, namely, if i ⊢ *p holds, p does not have a value which is inconsistent with i. Actually, the general propositional logic, predicate logic, and informal logic can be employed as the underlying logic depending on the evaluation facility of the interpreter to evaluate predicates.

(vii) Assuming that L, e, and i respectively are the underlying logic, the u-form, and the u-information item, an arbitrary translation method β effecting the operation thereof by use of L and i can be called "a generalized partial computation" so as to be discriminated from the restricted translation method α of the prior art and can be represented as β[L; e; i]. However, if the underlying logic is not particularly emphasized, the expression can be reduced to $\beta[e; i]$, which will be represented as "(e)i" in the following description.

(viii) Let us assume here b/g represents the u-form attained by simultaneously substituting any arbitrary appearance of u in the b in the u-form with the g in the u-form. For example, for b=car[u] and g=cdr[u], b/g=car[cdr[u]] results. Incidentally, "car" stands for the abbreviation of content of address part of register and indicates an instruction to obtain the first letter of a character string set to the register. On the other hand, "cdr" is an abbreviation of content of decrement part of register and denotes an instruction to attain the second and subsequent letters of a character string set to the register.

(ix) Partial definition function

Assuming e is a composite expression, when the g in the u-form has a relationship e=f[g] with respect to a function f and a relationship f=λ[[u]; b] with respect to the b in the u-form, the composite expression e is a non-primitive function. In this situation, in order to effect the partial computation of e with respect to the u-information item i, in a case where a simple translation is achieved, namely, (f[g])i is replaced with (b/g)i, if b includes a recursive or recurring call associated with f, there exists a possibility of repetitious operations of the similar partial computation. The partial definition function is adopted as a method to avoid such a repetition of the similar partial computation, namely, in a case where a partial computation of f[g] is achieved with respect to the u-information item i, before a result of the computation is obtained, a name (function name) $fg^i$ is beforehand assigned to the result, where g, i, and $fg^i$ are called a symbol argument, a partial information, and a partial definition function, respectively. Although the partial definition function $fg^i$ can be completely defined as a program only when the partial computation is finished, a fact that the computation result becomes to be $fg^i$ is used at an intermediate point of the partial computation.

Prior to the initiation of the partial computation, assuming that H designates a global set of a function in the null state, if there exists a u-information j having the following property for the u-information i and e=f[g] in the u-form, it is considered that (e)i has already been partially defined. Incidentally, the set H above is concretely a function name register table area which can be referenced by the translation program.

(Condition 1): i ⊦*j/k (Condition 2): The function name $fd^j$ is included in H, where d and k is in the u-form satisfying g=d/k. In this case, $fd^j$ is also a partial definition function.

EXAMPLE 1

For j=φ, if $fd^i \in$ H for arbitrary u-information i and arbitrary d and k represented as g=d/k, $fd^i$ is proved as a partial definition function of (e)i because i ⊦*φ and φ/k=φ.

EXAMPLE 2

For g=cdr[u], k=cdr[u], d=u, j2=φ, and $fd^{j2} \in$ H, $fu^\phi$ is proved as a partial definition function of (e)i based on the example 1.

EXAMPLE 3

For g=cdr[u], k=cdr[u], d=u, j3= ¬ null[cd²r[u]]∧ (cadr [u]=A)∧(car[u]=A), $fd^{j3} \in$ H, and i= ¬ null [cd³r[u]]∧¬ (cad³r[u]=B)  ∧(cad³r[u]=A)∧(cadr[u]=A)∧(car[u]=A), $fu^{j3}$ is proved to be a partial definition function of (e)i because of i ⊦*j3/cdr[u]. Incidentally, "cd²r" is also described as "cddr", which indicates that "cdr" is to be repeated twice, whereas "cadr" means that "car" is further effected on data undergone a "cdr" operation.

Like in the cases of $fd^{j2}$ and $fd^{j3}$ described above, for one (e)i, there may exist two or more functions for which the partial definition is possible.

In a case where the underlying logic is of an substituted type (namely, if i ⊦*j then i/k ⊦*j/k), if $fd^j$ is a parial definition function of (f[g])i, (f[g]i)i can be replaced with ($fd^j$ [k])i. By the substitution the partial definition function, a recursive call of $fg^i$ may be introduced to the result of the partial computation. In this case, the output result of β corresponds to a set of recursive or recurrent equations.

By use of the partial definition function above, for a program for which a partial computation has already been effected (or the partial computation has been achieved up to an intermediate point thereof), another partial computation can be further conducted depending on the new information item thus obtained. As a result, the efficiency of the partial computation can be greatly increased. In addition, a partial computation which may result in an infinite loop by attempting a similar computation can also be prevented. However, these effects are exclusive to each other, namely, when the former effect is determined not to be expected, for example, when the result of the partial computation becomes too great or when the improvement of the program efficiency is not to be expected any more, the latter effect will be selected.

(x) In order to indicate the usage of the partial definition function, a partial definition operator ← is employed. For example, for a description of $$f[u] \leftarrow \beta[e;i]$$

or f [u]←(e)i, in a case where the function f is referenced after the operator ← is executed, it is assumed that β[e:i] indicates that the body of function f is defined as a function of which the substantial entity is a u-form (an intermediate result of translation) obtained as a result of a translation effected on e by the pertinent point of time.

Referring next to the accompanying drawings, description will be given of embodiments according to the present invention.

Figure 1:
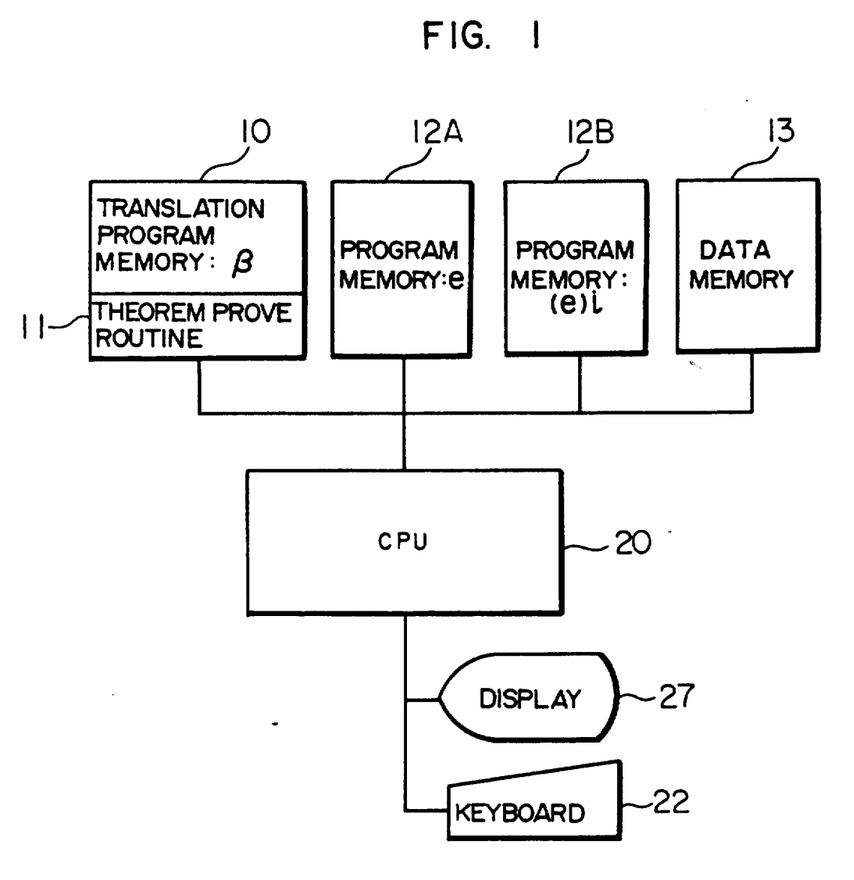
FIG. 1 is a schematic configuration diagram showing a data processing system in which the present invention is effected.

FIG. 1 schematically shows a system in which the program translation is achieved according to the present invention. The configuration of FIG. 1 includes a memory 10 for storing therein the translation program β, a memory 11 for storing therein theorem prove routines utilized in the program β, a memory 12A for storing therein the program e as a translation object, a memory 12B for storing therein the translated program (e)i, a data memory (or a data file) 13, a processor (central processing unit, CPU) 20 for executing the respective programs, and a display 21 and a keyboard 22 for establishing interfaces with the operator. The CPU 20 executes the translation program β to conduct a partial computation of the program e, thereby writing the result of the computation as a program (e)i in the memory 12B. The partial computation is also repeatedly achieved for the program written as a result of the translation in the memory 12B.

Figure 3:
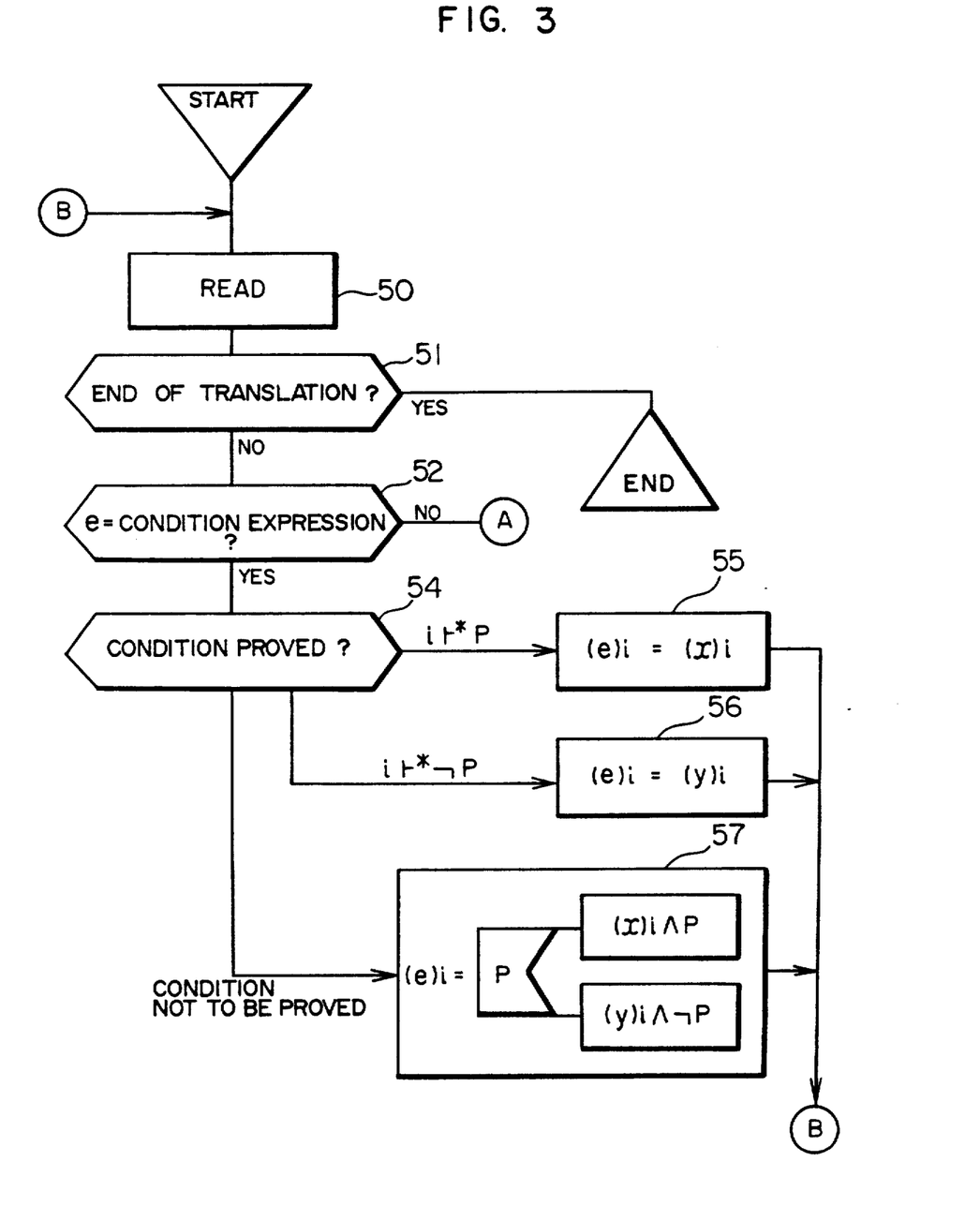
FIGS. 3 and 4 are flowcharts showing the basic procedure of the program translation processing according to the present invention.
Figure 4:
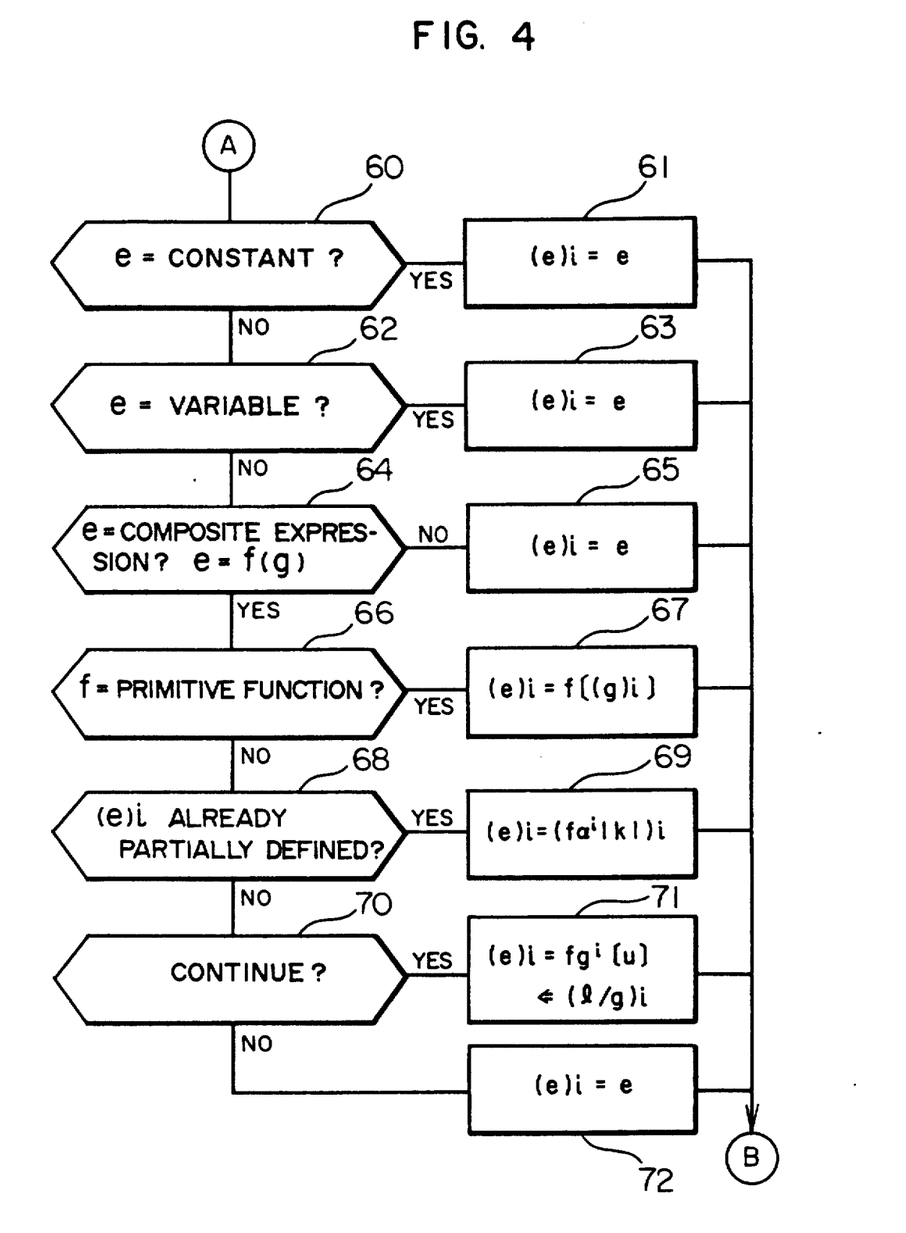

FIGS. 3 and 4 are flowcharts showing an example of a partial computation program β for the program translation according to the present invention. The program e read from the memory 12A (or 12B) in a step 50 is checked to determine whether or not the program e is a conditional expression (step 52). If this is a conditional expression, control is passed to a step 54; otherwise, the processing procedes to a step 60 of FIG. 4.

(1) In a case of a conditional expression: In the step 54, it is checked to determine whether or not the true or false state of the condition p can be proved by use of the information item i. This decision is effected by the theorem prove routine 11. In this routine, the known information, the additional information, or the program is checked in the backward direction so as to determine whether or not the condition p has already been satisfied. This decision is based on axioms or theorems in some cases. If the condition p is satisfied (i ⊢*p) according to the information item i, the partial computation (x)i is executed, by use of the information item i, at the positive branch destination of the conditional expression (step 55). In a case where it is determined that the condition p is not satisfied (i ⊢*¬ p), the partial computation (y)i is executed at the negative branch destination of the conditional expression (step 56). If the conditions above cannot be determined, control proceeds to a step 57 so as to utilize the additional information item p or ¬ p with the conditional expression p retained, thereby effecting the partial computation at the branch destination x or y of the conditional expression p.

If the program e is not a conditional expression, the processing is achieved through steps 60 to 72 as follows.

(2) When e is a constant: (e)i=e is assumed.

(3) When e is a variable: (e)i=e is assumed.

(4) When e is a composite expression (e=f[g]):

(4.1) If f is a primitive function, (e)i=f[(g)i] is assumed.

(4.2) If f is a non-primitive function (f=λ[[u]: b]):

(4.2.1) If (e)i has already been partially defined, one of the partial definition functions, fd$^i$ is selected so as to assume (e)i=(fd$^i$[k])i.

(4.2.2) If (e)i has not been partially defined, one of the following operations is selected.

(4.2.2.1) (e)i=fg$^i$[u] is assumed; where, after fg$^i$ is added to H, fg$^i$[u]←(b/g)i is defined.

(4.2.2.2) (e)i=e is assumed.

In a case where the partial definition is not present, the selection to determine whether or not the partial definition is to be effected is decided according to whether or not a satisfactory effect can be expected by continuing the partial computation. The decision is accomplished as follows. For example, a partial computation is provisionally executed so as to effect the decision through a simulation comparison between the translation result including the partial computation and the preceding translation result, or the selection is effected according to the count limit of the partial definitions (4.2.2.1).

Figure 5:
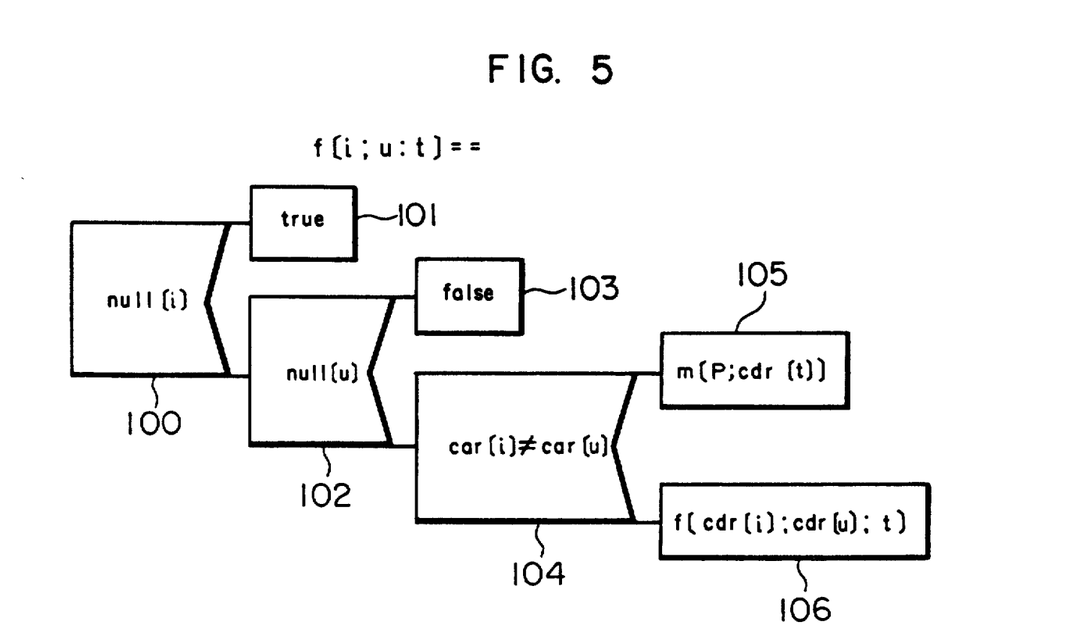
FIG. 5 is a schematic diagram showing the configuration of a program for a pattern matching which is a translation object in an embodiment according to the present invention.

Referring next to a pattern matching program of FIG. 5 as an example of the translation object program, description will be concretely given of the difference between the program translation result (FIGS. 6A to 6E) obtained by use of the conventional partial computation α and the program translation result (FIGS. 7 to 14D) attained by use of the general partial computation β according to the present invention.

Assuming here that the text and a pattern to be retrieved are respectively expressed as t and P, the function of the pattern matcher can be represented as m[p; t]; moreover, the value thereof, namely, the result of the pattern matching is "true" if the pattern p is included as a part of the text t; otherwise, "false" results.

In the program of FIG. 5, the pattern matcher m[p; t] is replaced with an auxiliary function f[p; t; t] so as to achieve the pattern matching by use of the parameters i, u, and t. In this operation, the pattern p and the text t substitute for the parameters i and u, respectively. In a step 100 of this program, it is checked to determine whether or not i (pattern p) is null (empty). If this is the case, a true state is determined (step 101); otherwise, a step 102 is executed to determine whether or not the text u is null (empty). If the text u is null a false state results (step 103); otherwise, a step 104 is effected to determine whether or not car[i] (the first letter of the pattern p) matches with car[u] (the first letter of the text u). If these letters do not match each other, a pattern matching m is conducted (step 105) by using cdr[t] (a character string constituted with the second and subsequent letters of the text t) as a new text t; otherwise, a pattern matching f is achieved (step 106) by respectively using cdr[i] (a character string constituted with the second and subsequent letters of the pattern i) and cdr[u] (a character string constituted with the second and subsequent letters of the text u) as the new values of the pattern i and the text u.

Assume here that as a concrete value, for example, a character string AAAB is assigned to the pattern p. If the program translation is accomplished in this situation by use of the conventional partial computation α, the program of FIG. 5 is first translated into a program mp[t] of FIG. 6A. In this case, since a partial computation is further generated for the program mp[t] thus attained, for simplification of description, (AAAB), (AAB), (AB), (B), and ( ) are assumed to be represented as 1, 2, 3, 4, and 5, respectively such that the partial computation result attained by use of the pattern p=(AAAB) assigned to the program m[p; t] is expressed by use of the digits above as "m$_1$ [t]". Similarly, the partial computation result attained by use of the pattern i=(AAB) assigned to the program f[i;u;t] is expressed as "f$_2$[u;t]".

Figure 6A:
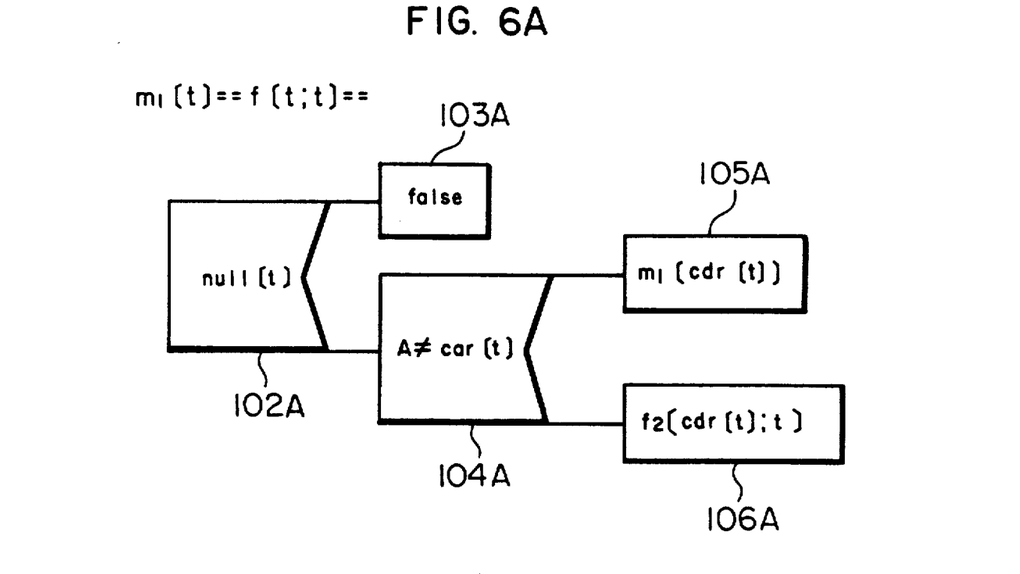
FIGS. 6A to 6E are diagrams showing a program configuration attained by translating the program of FIG. 5 in the conventional translation method.

In the case of this example, when the pattern i=-[AAAB] is applied to FIG. 5, null[i]=null[(AAAA)]-=false results; in consequence, the result m$_1$[t] of the partial computation is represented as shown in steps 102A to 106A of FIG. 6A, namely, the steps 100 and 101 are removed. Furthermore, in the step 104, car[i]=-[car(AAAB)]=A results; consequently, the step 104 is translated into a step 104A. In this translation result, since a partial computation further takes place in f$_2$ of the step 106A, a similar operation is repeatedly achieved in the order of FIGS. 6B to 6E, thereby effecting the program translation.

In the program translation above, for example, when texts are sequentially read from a data file so as to retrieve a text including the pattern (AAAB) or so as to detect a position of the pattern in a detected text, the retrieval operation is effected prior to the processing. In this example, the program size of the program m$_1$[t] attained by the translation using the partial computation α is increased to be about four times the original program size; however, by using the resultant program, the period of time required for the retrieval can be minimized as compared with the case where the pattern retrieval is directly effected by use of the original program.

Figure 6B:
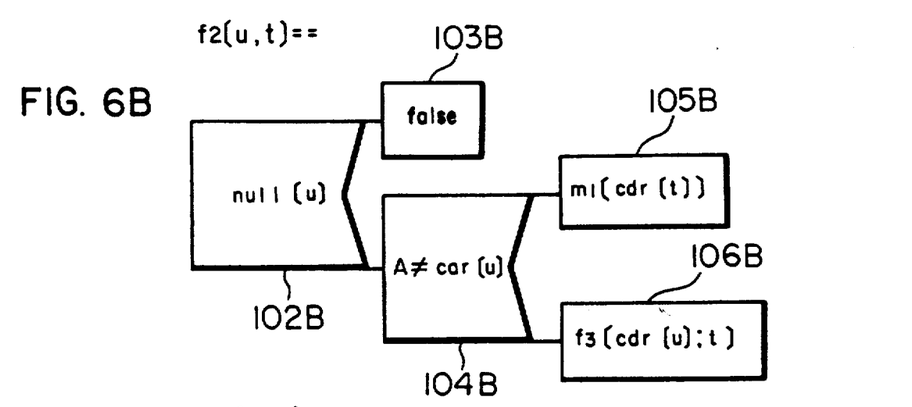
Figure 6C:
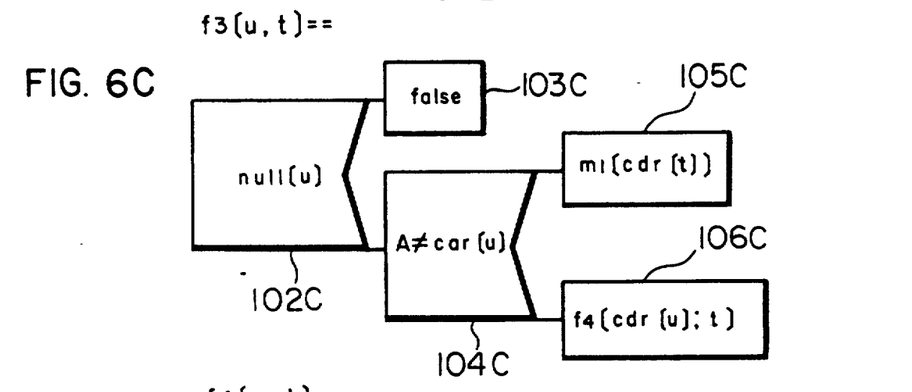
Figure 6D:
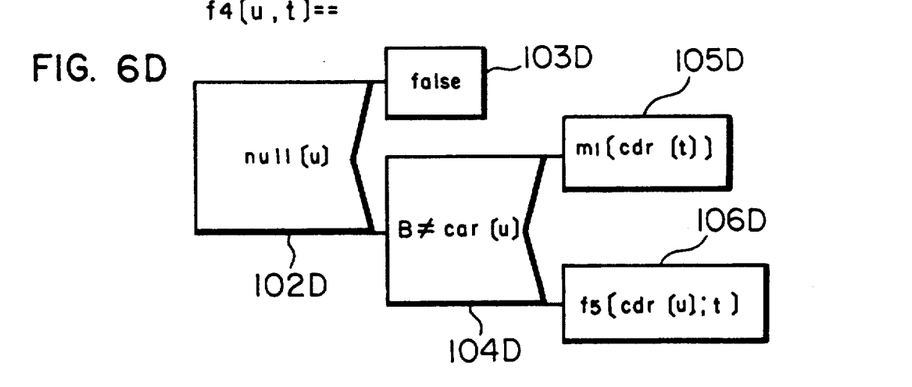
Figure 6E:
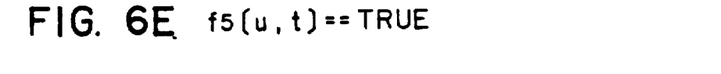
Figure 15:
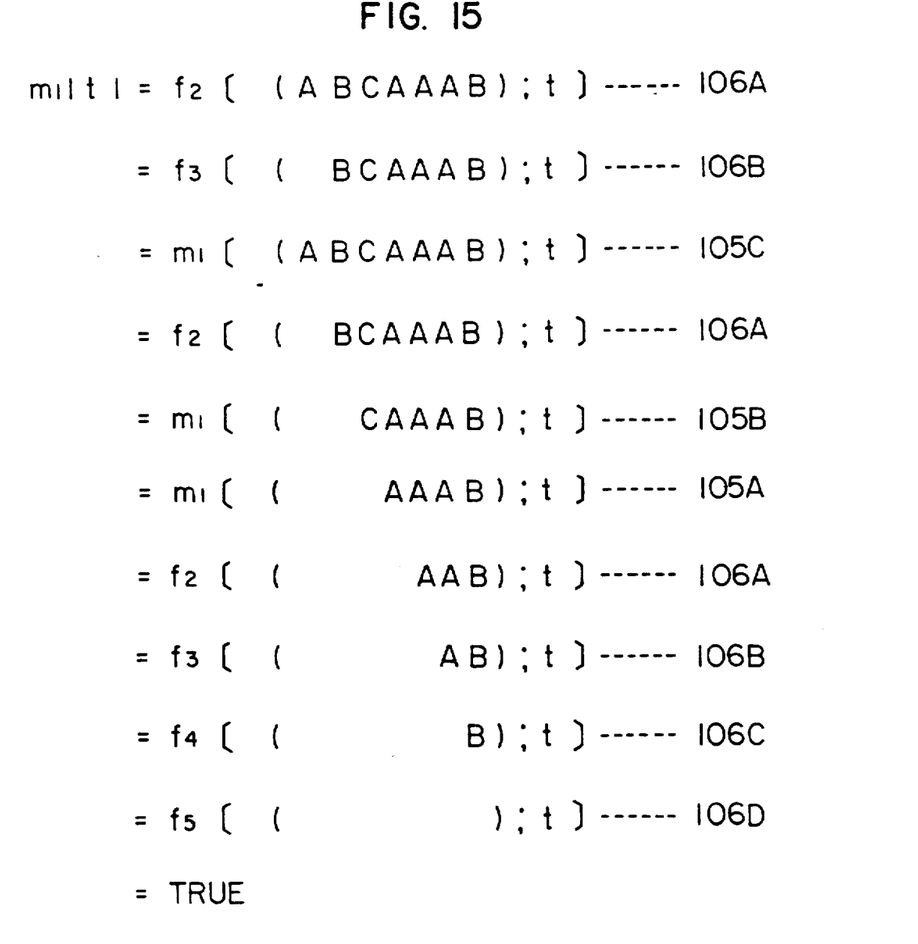
FIGS. 15 and 16 are diagrams useful to explain concrete data processing steps associated with the programs attained according to the present invention as compared with the conventional method.

Assuming that the given text is, for example, AAB-CAAAB, when this character string is assigned to the parameter t of FIG. 6A, the steps 102A, 104A, and 106A are sequentially executed so as to proceed the processing to FIG. 6B. In the execution processes, the final execution steps of FIGS. 6A to 6E are as shown in FIG. 15 in which true finally results, namely, there is attained an answer that the pattern AAAB is found in this text.

On the other hand, according to the present invention, the program of FIG. 5 above is translated as follows.

Although (m[p;t]) $\{p=(AAAB)\}$ may be directly computed, description will be here given of a case where in a similar fashion as for the conventional partial computation $\alpha$, in the state where $m_1[t]$ of FIG. 6A has already been obtained, the general partial computation is effected thereon with respect to the null information $\phi$. As the underlying logic, an ordinary informal logic on the LISP will be employed.

Figure 7:
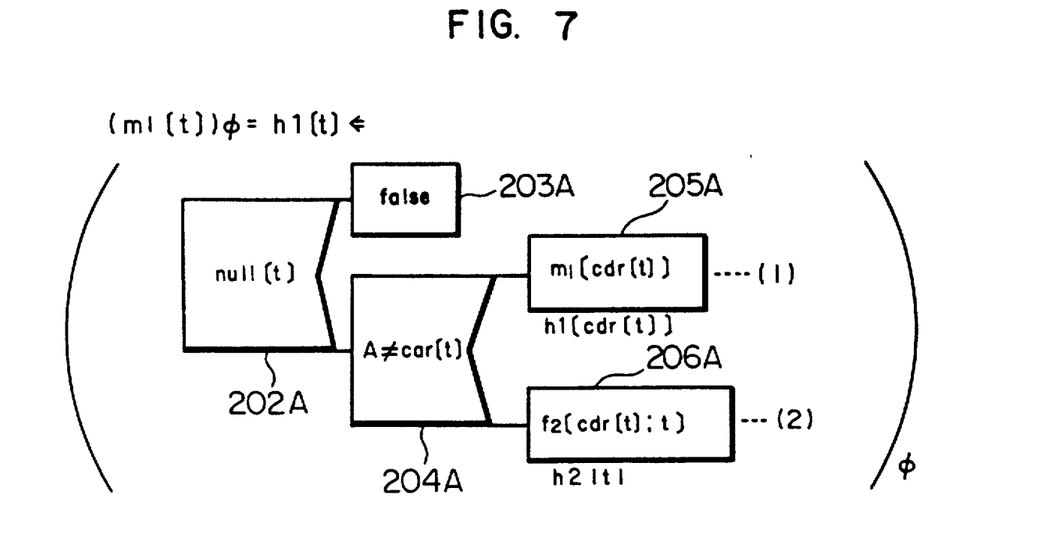
FIGS. 7 to 13 are diagrams useful to explain translation processes employed when the program of FIG. 5 is translated by use of the translation method according to the present invention.

The result of the general partial computation of $m_1[t]$, namely, $(m, [t])_{100}$ becomes as shown in FIG. 7. In this diagram, h1 denotes a partial definition function $m_1 r\phi$. In addition, in FIG. 7, the formats hl[cdr[t]] and h2[t] respectively shown outside of the steps 250A and 206A respectively represent final translation results attained when the contents described in the respective frames are subjected to the partial computations. Furthermore, the numbers (1) and (2) indicated on the right-hand side of the respective frames are disposed to indicate that the partial computations of the formats in the respective frames are developed under the respective numbers as follows. Incidentally, the new information items attained through the partial computations of the steps respectively having these numbers are represented for example as i1 and i2 assigned with the corresponding numbers (1) and (2), respectively.

Computation 1: The translation step 72 (FIG. 4) is executed by use of i 1 = ¬ null[t]∧(A≠car[t]).

As a result, $(m_i[cdr[t]])_{i1} = h1(cdr[t])$ is obtained.

Figure 8:
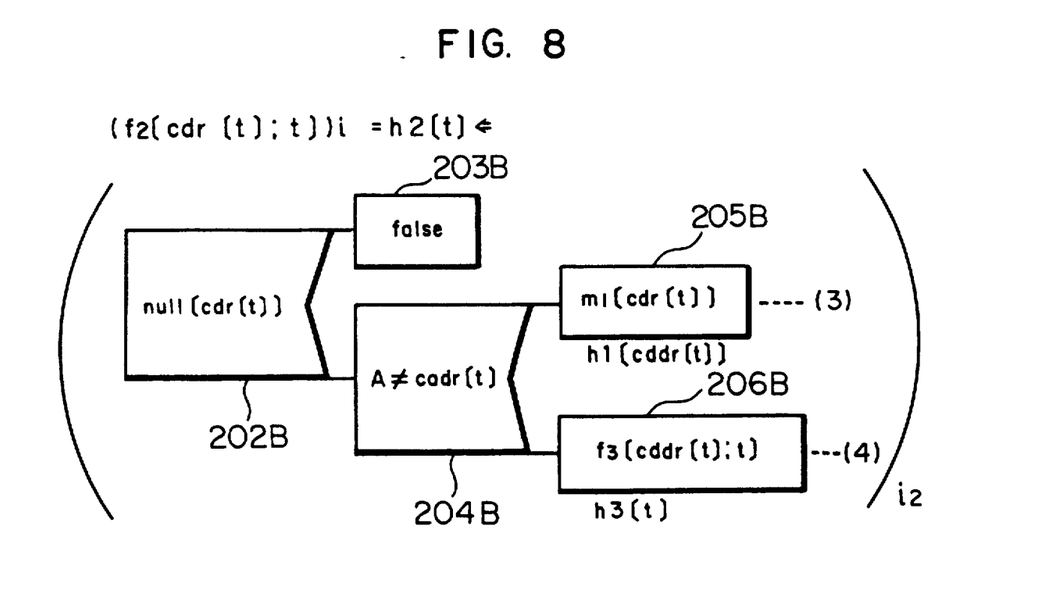

Computation 2: Using i2 = null[t]∧(A = cȧr[t]), in the step 71 of FIG. 4, $(f_2(cdr[t];t])_{i2}$ is executed. The result is as shown in FIG. 8. In this diagram, h2 indicates a partial definition function $f_2[cdr[t]t,t]_{i2}$. (Similarly, h3, h4, etc. denotes the partial definition functions associated with f2, F3, etc.)

Figure 9:
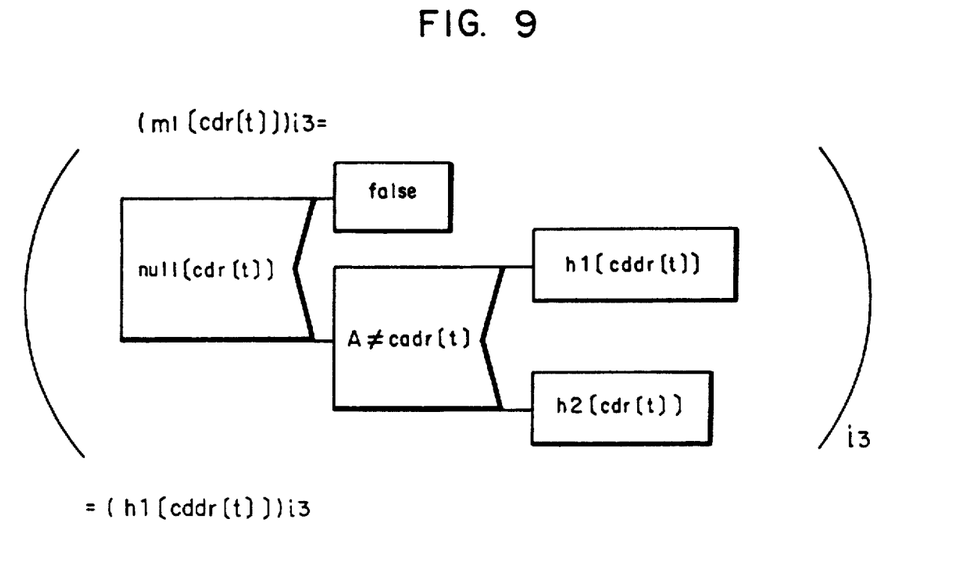

Computation 3: Using i3 = i2∧¬ null[cdr[t]]∧(A≠cadr[t]), $(m_1[cdr[t]])_{i3}$ is executed in the translation step 69. At the intermediate points, the steps 56 and 55 are executed so as to attain an intermediate result $(h1[cddr[t]])_{i3}$ as shown in FIG 9. For this result, the translation step 72 is further executed such that the final result of the block 205B is obtained as $h1[cddr[t]]_{i3}$.

Figure 10:
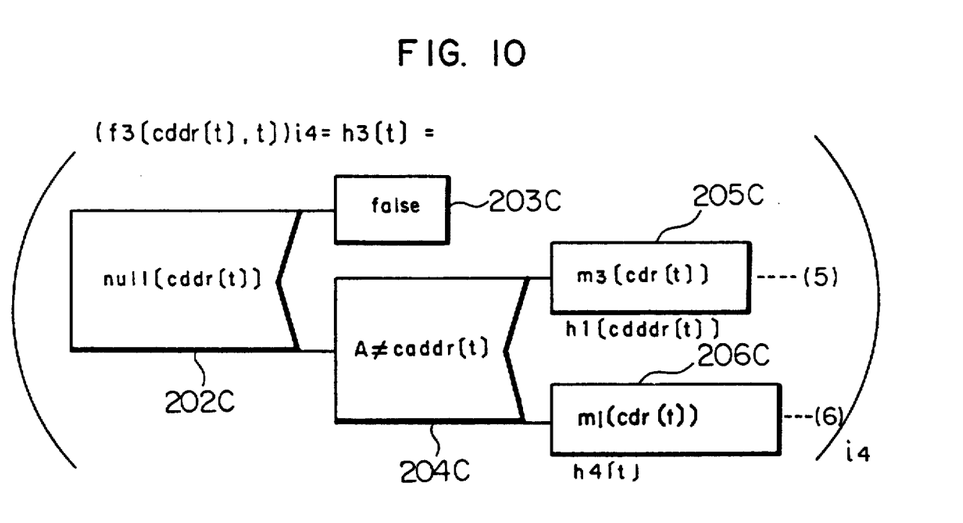

Computation 4: Using i4 = i2∧¬ null[cdr[t]]∧(A = -cadr[t]), $(f_3[cddr[t];t])_{i4}$ is executed in the translation step 71. The execution result is as shown in FIG. 10.

Figure 11:
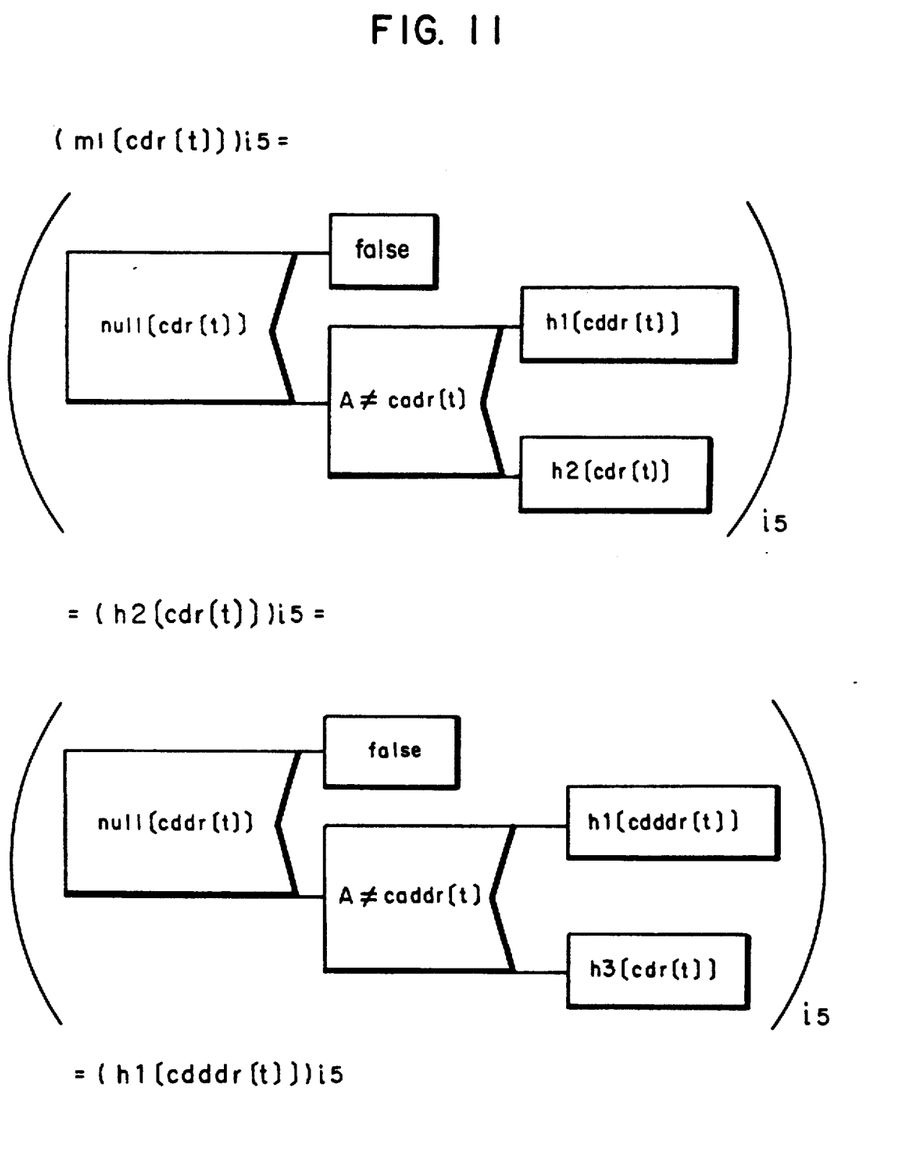

Computation 5: Using i5 = i4∧null[cddr[t]]∧(A≠caddr[t]], $(m_1[cdr[t]])_{i5}$ is executed in the translation step 71. For the blocks for which the partial definition has been effected, the translation step 69 is executed so as to attain $(h1[cdddr[t]])_{i5}$ as a result as shown in FIG. 11. For this result, the translation step 72 is further achieved so as to obtain the final result h1[cdddr[t]] from the block 205c.

Figure 12:
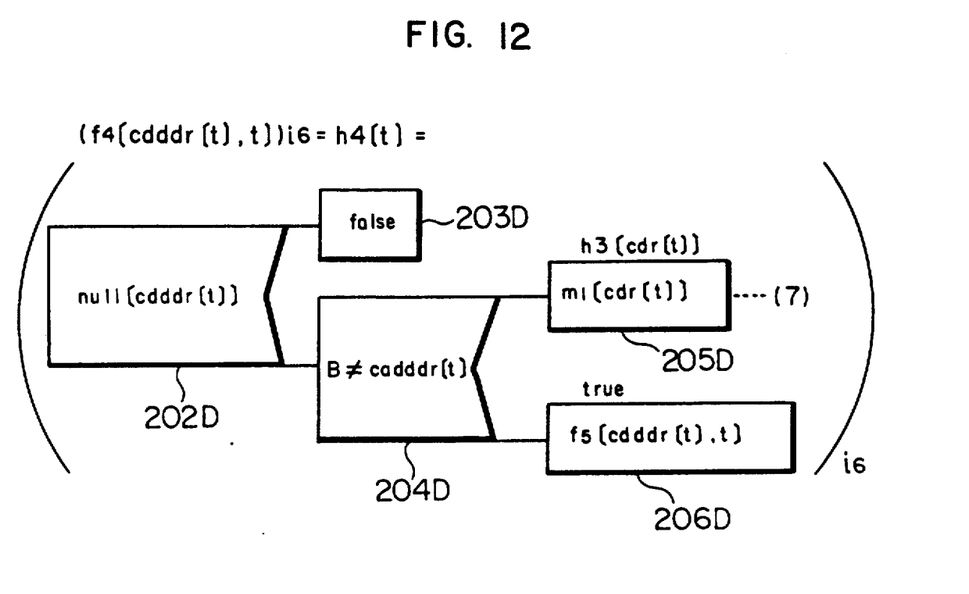

Computation 6: Using i6 = i4∧¬ null[cddr[t]]∧(A = -caddr[t])], $(f_4[cdddr[t];t])_{i6}$ is executed in the translation step 71. The result is as shown in FIG. 12.

Figure 13:
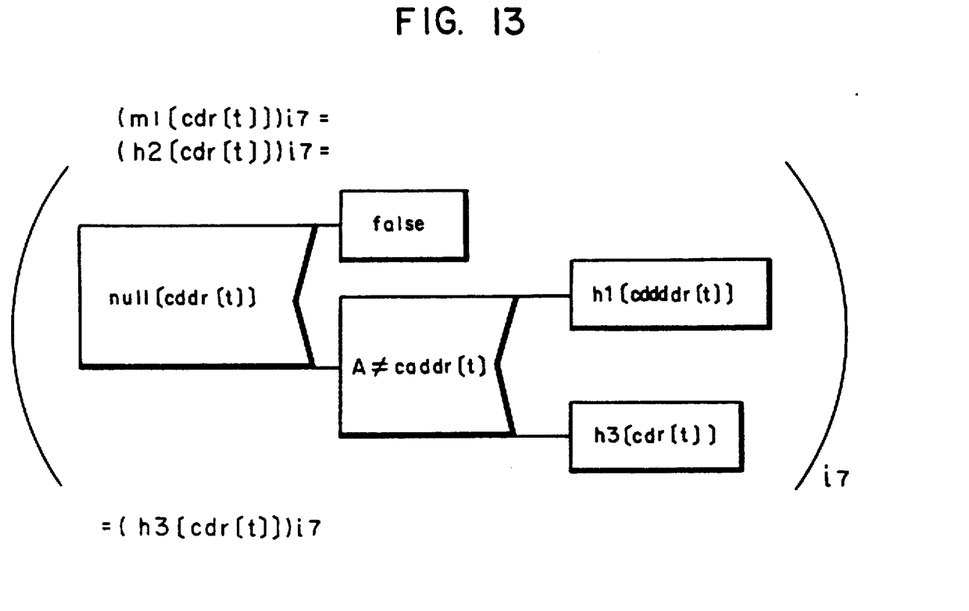
Figure 14A:
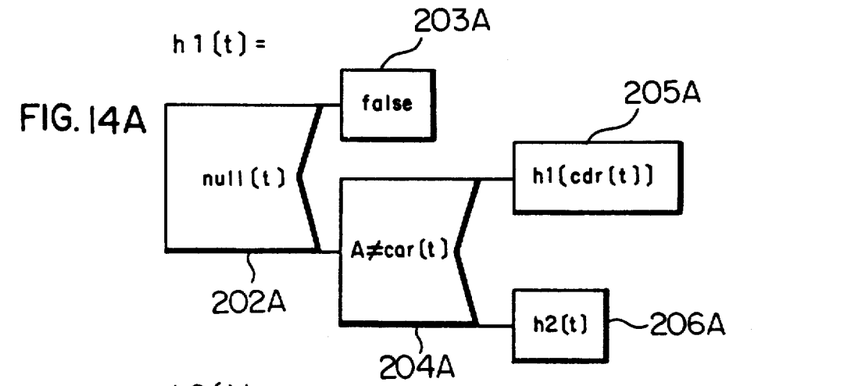
FIGS. 14A to 14D are schematic diagrams showing configurations of pattern matching programs attained through the translation according to the present invention.
Figure 14B:
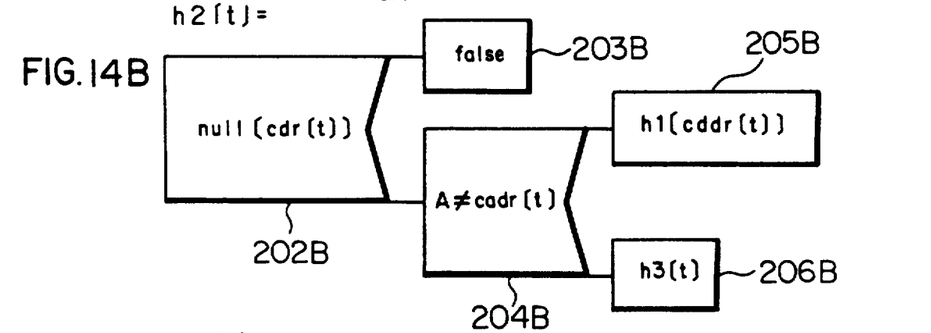
Figure 14C:
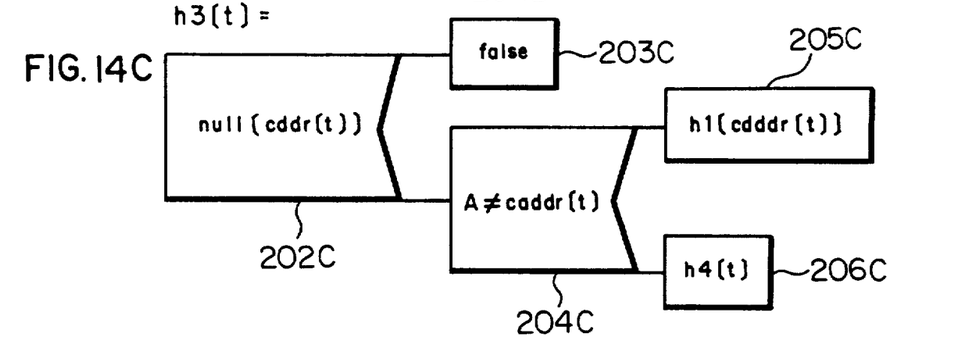
Figure 14D:
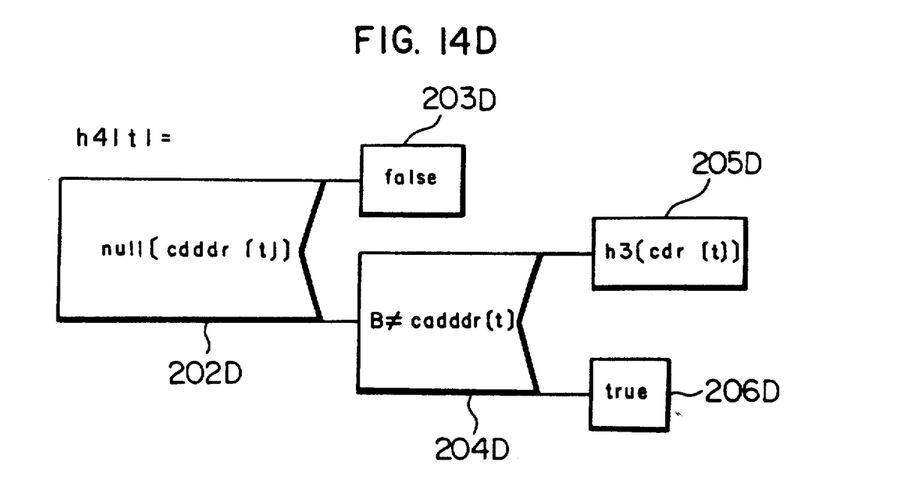

Computation 7: Using i7 = i6∧¬ null[cdddr[t]]∧(B-≠cadddr[t]), $(m_1[cdr[t]])_{i7}$ is executed in the translation step 71. The result is $(h3[cdr[t]])_{i7}$ as shown in FIG. 13.

For this result, the translation step 72 is executed so as to attain the final result h3[cdr[t]] from the block 205D.

As a result of the translation above, according to the present invention, the pattern matching program m[p;t] of FIG. 5 is translated, through the general partial computation $(m_1[t])_{100}$ effected when the pattern p=(AAAB) is supplied, as shown in FIGS. 14A to 14D.

Figure 16:
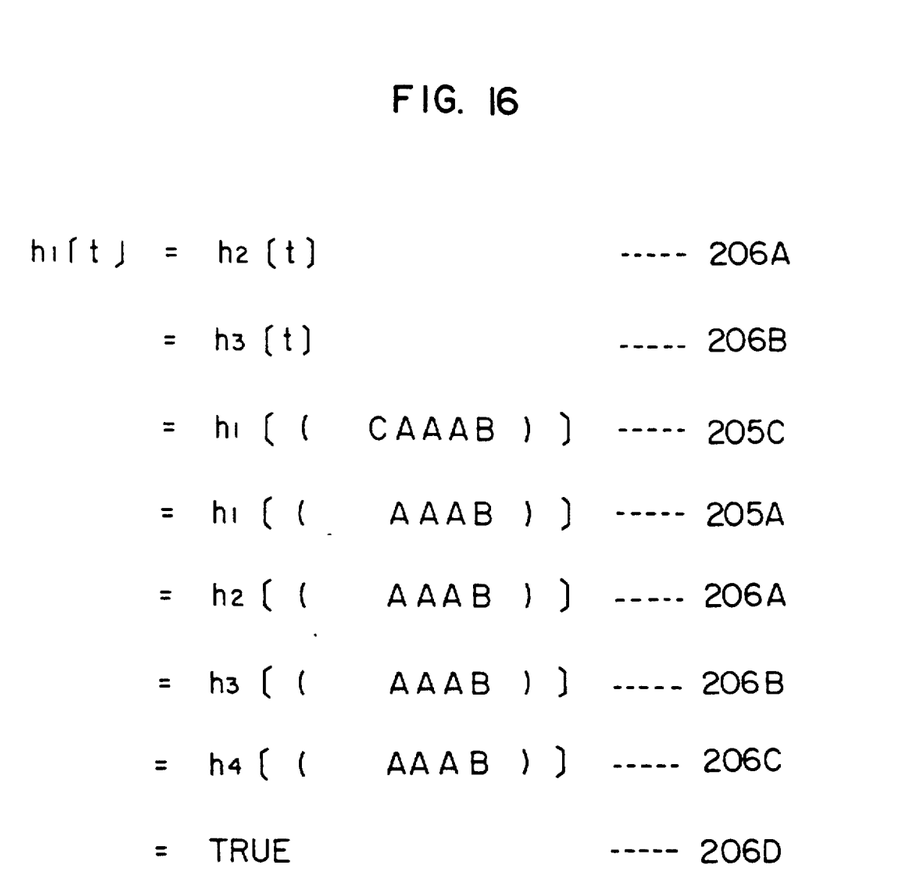

For the program thus attained, in a case where AAB-CAAAB is supplied as the text t in a similar fashion to that employed in the conventional example, the final execution steps of FIGS. 14A to 14D becomes to be as shown in FIG. 16 according to the execution processes of the program beginning from h1[t]. Comparing this result with that attained in the case of the conventional example, the number of steps required for the program translated according to the present invention to attain the answer is clearly less that that required for the program attained in the conventional method, namely, an efficient program is obtained through the translation according to the present invention.

Next, description will be given of a variation according to the present invention. In this variation, a given program step e is checked to select one of the following four steps.

(1) When e is a conditional expression, the operation is the same as for the first embodiment.

(2) When e is a constant or a variable, (e)i = e is assumed.

(3) If i ⊢*{v = e} for a certain v in the u-form, (e)i = (-v)i is assumed.

(4) When e is a composite expression, namely, e = f[g] for a function, one of the following operations (4.1) to (4.5) is effected.

(4.1) A partial definition of (e)i is effected, namely, $(e)i = fg^i[u]$ is assumed; where, after $fk^i$ is added to the null set, $fg^i[u] \leftarrow e'$ is effected. In this case, e' corresponds to the right side of the translation rule other than (4.1).

(4.2) When (e)i is beforehand partially defined, a function $fd^i$ is selected therefrom so as to assume $(e)i = (-fd^i[k])$ (where, g = d/k, i ⊢*j/k). In this case, the smaller is the distance between the partial information j and i, the better is the execution efficiency of the partial computation.

(4.3) When f is a non-primitive function (for example, f = λ[[u];b]), (e)i = (b/g)i is assumed.

Figure 17A:
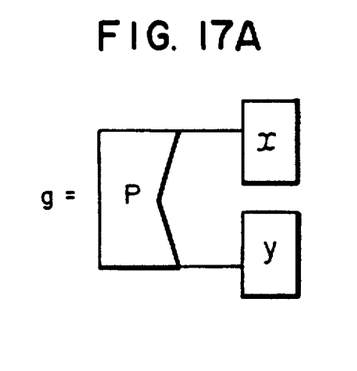
FIGS. 17A and 17B are explanatory diagrams for explaining program translation rules in another embodiment according to the present invention.
Figure 17B:
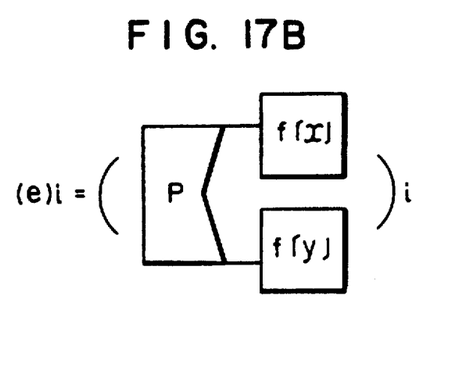

(4.4) When g is a conditional expression, for example, like the case of FIG. 17A, the translation is achieved as shown in FIG. 17B.

(4.5) The result of (g)i is assigned to f so as to execute the partial computation from the inner-most item, namely, (e)i = (f[(g)i])i is assumed.

Figures 18A, 18B:
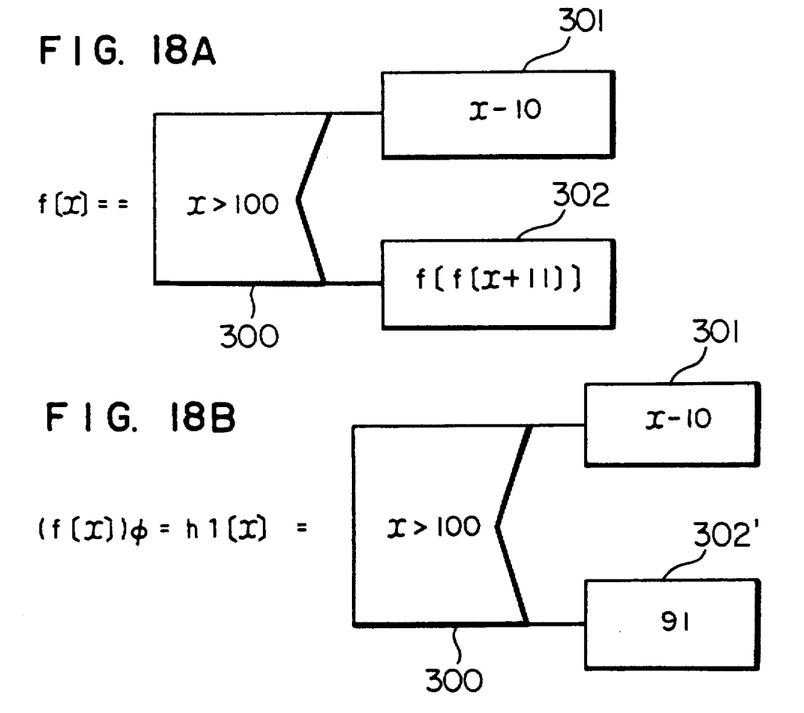
FIGS. 18A and 18B are diagrams useful to explain other translation examples according to the present invention.

By using the variation above, namely, by combining this variation with a kind of recurrent removal rule, for example, a program f[x] comprising the blocks 300 to 302 of FIG. 18A can be translated as shown in FIG. 18B. This example indicates that even when concrete values are not assigned to parameters, by effecting the general partial computation on the program f(x) with respect to the null information, namely, by executing $(f[x])_{100}$, a redundant description portion (block 302) can be translated into a quite simple description (block 302').

As can be understood from the description above, according to the program translation method of the present invention, the partial computation of each step of a program is accomplished by use of broad information in the operating environment; in consequence, as compared with the conventional translation method, the program attained by the translation method according to the present invention can produce a program having an increased efficiency.

We claim:

1. A program transformation method of transforming a functional program having at least a conditional expression, by applying a procedure to said functional program using information of an operating environment represented by a predicate logic formula, said procedure being carried out by a computer having a memory, a central processing unit and an input/output device, said method comprising the steps of:

(a1) determining by said computer whether an expression of said functional program is a conditional expression;

(a2) if said expression of said functional program is a conditional expression, determining by said computer whether a judgement condition contained in said conditional expression or a negation of said judgement condition is provable using said information;

(a3) if said judgement condition is provable in step (a2), applying by said computer said procedure to a true part of said judgment condition using said information and replacing by said computer said conditional expression with a result of applying said procedure to said true part of said judgement condition;

(a4) if said negation of said judgement condition is provable in step (a2), applying by said computer said procedure to said false part of said judgment condition using said information and replacing by said computer said conditional expression with a result of applying said procedure to said false part of said judgement condition; and (a5) if neither said judgement condition and said negation of said judgement condition are provable in step (a2), applying by said computer said procedure to said true part of said judgement condition using a logical product of said information and said judgment condition, applying by said computer said procedure to said false part of said judgment condition using a logical product of said information and said negation of said judgement condition and replacing said true part of said judgement condition and said false part of said judgement condition by a result of applying said procedure to said true part of said judgement condition using said logical product and a result of applying said procedure to said false part of said judgement condition using said logical product respectively.

* * * * *